(12) United States Patent
Asao et al.

(10) Patent No.: US 6,333,582 B1
(45) Date of Patent: *Dec. 25, 2001

(54) ROTOR FOR AN ALTERNATOR (75) Inventors: Yoshihito Asao; Kenji Tsuruhara; Kyoko Higashino; Katsumi Adachi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/585,550

(22) Filed: Jun. 2, 2000

(30) Foreign Application Priority Data

Jan. 11, 2000 (JP) .................................... 12-002504

(51) Int. Cl.⁷ .................................................. H02K 21/14
(52) U.S. Cl. ....................................... 310/263; 310/156.66
(58) Field of Search .................................. 310/261–263, 310/257, 192, 43; 29/596–598

(56) References Cited

U.S. PATENT DOCUMENTS

| | | | | |
|---|---|---|---|---|
| 5,483,116 | * | 1/1996 | Kusase et al. | 310/263 |
| 5,909,071 | * | 6/1999 | Sakuma et al. | 310/51 |
| 5,969,459 | * | 10/1999 | Taniguchi et al. | 310/263 |
| 6,011,343 | * | 1/2000 | Taniguchi | 310/263 |
| 6,013,968 | * | 1/2000 | Lechner et al. | 310/263 |
| 6,150,746 | * | 11/2000 | Lechner | 310/181 |
| 6,157,111 | * | 12/2000 | Asao | 310/263 |
| 6,201,335 | * | 3/2001 | Higashino et al. | 310/263 |
| 6,225,727 | * | 5/2001 | Oohashi et al. | 310/263 |

FOREIGN PATENT DOCUMENTS 11-136913   5/1999   (JP) .............................. H02K/19/22

\* cited by examiner

Primary Examiner—Tran Nguyen
(74) Attorney, Agent, or Firm—Sughrue Mion, PLLC

(57) ABSTRACT

A rotor has plural reinforcing bodies each approximately formed in a U-shape having wing portions arranged in both side portions of an attaching portion of a flat plate shape, and disposed such that the attaching portion faces to each of inner circumferential wall surfaces of claw-shaped magnetic poles and the wing portions are located on both sides of the claw-shaped magnetic poles in the circumferential direction; and plural magnets each fixedly attached to both wing portions of each of the reinforcing bodies and disposed on both sides of the claw-shaped magnetic poles in the circumferential direction, for reducing leaked magnetic flux between the claw-shaped magnetic poles adjacent to each other, wherein a multidegree of freedom vibrating system composed of the claw-shaped magnetic poles and the reinforcing bodies fixedly attaching the magnets thereto is constructed by attaching each of the reinforcing bodies in a state in which at least one portion of the attaching portion is fixedly attached to the inner circumferential wall surfaces of each of the claw-shaped magnetic poles.

13 Claims, 9 Drawing Sheets

ROTOR FOR AN ALTERNATOR

BACKGROUND OF THE INVENTION

1. Field of the Invention

The present invention relates to an alternator driven by an internal combustion engine, and more particularly, to a rotor for the alternator mounted to a vehicle such as a passenger car and a truck.

2. Description of the Related Art

Figure 12:
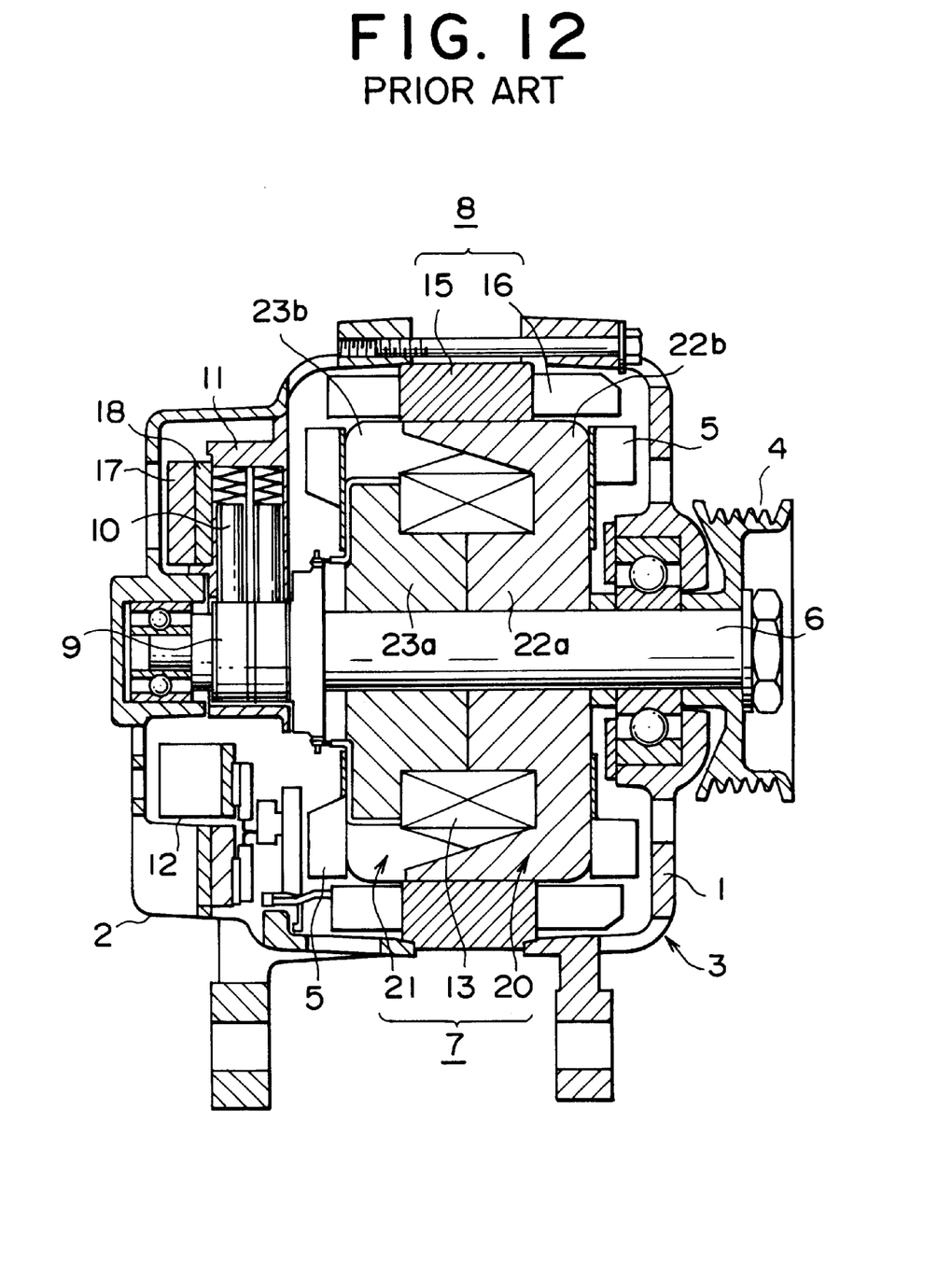
FIG. 12 is a cross-sectional view showing a conventional alternator for a vehicle.
Figure 13:
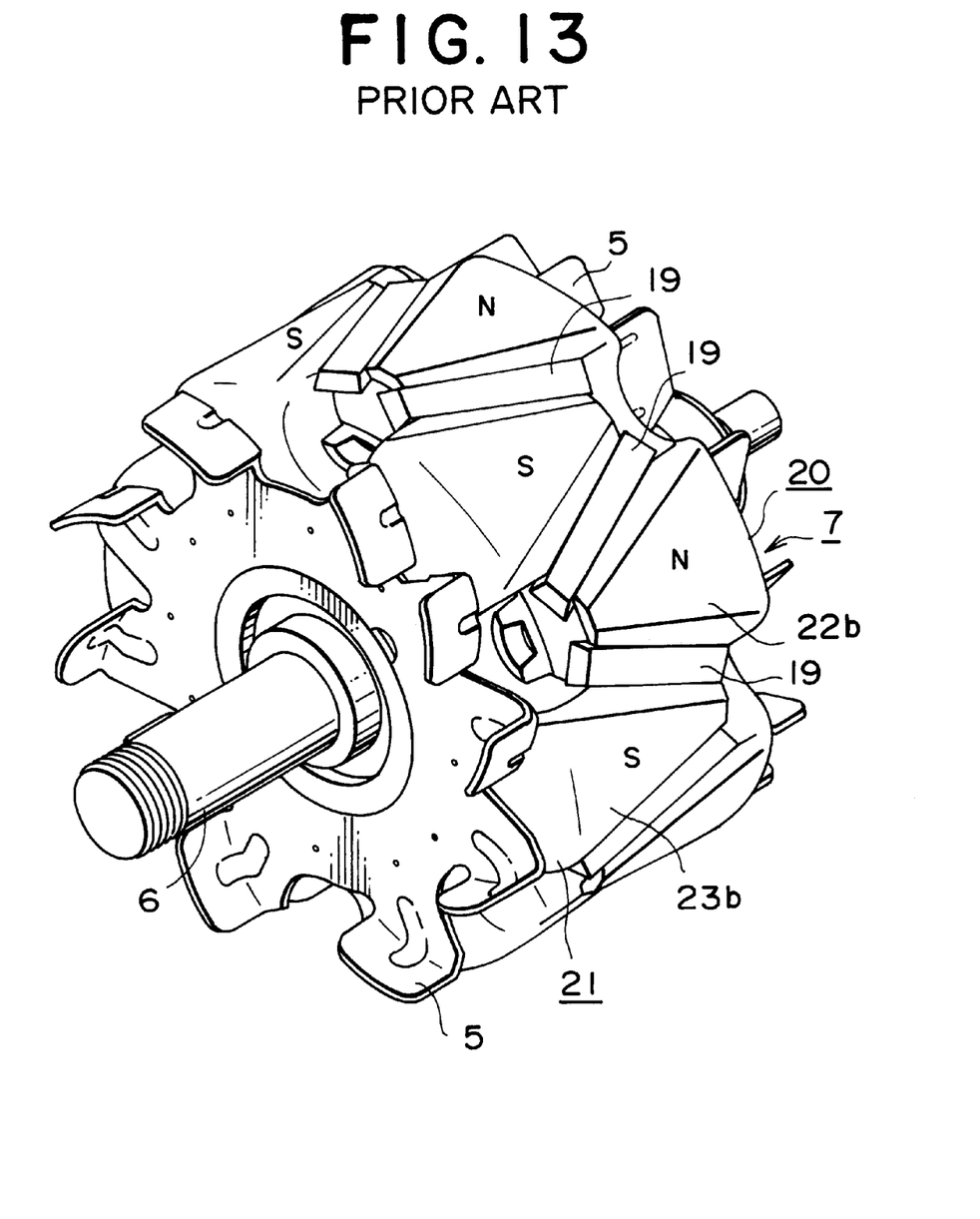
FIG. 13 is a perspective view showing a rotor for the conventional alternator for a vehicle.

FIG. 12 is a cross-sectional view showing a conventional alternator for a vehicle. FIG. 13 is a perspective view showing a rotor for the conventional alternator for a vehicle.

In FIGS. 12 and 13, the alternator for a vehicle is constructed such that a Lundell-type rotor 7 is rotatably mounted within a casing 3 including an aluminum front bracket 1 and an aluminum rear bracket 2 by means of a shaft 6, and a stator 8 is fixedly attached to an inner wall surface of the casing 3 so as to cover an outer circumferential side of the rotor 7. Fans 5 are fixedly attached to both ends of the rotor 7 in its axial direction.

The shaft 6 is rotatably supported by the front bracket 1 and the rear bracket 2. A pulley 4 is fixedly attached to one end of the shaft 6 to enable rotational torque from an engine to be transmitted to the shaft 6 by means of a belt (not shown). Slip rings 9 for supplying electric current to the rotor 7 are fixedly attached to the other end portion of the shaft 6. A pair of brushes 10 are housed in a brush holder 11 disposed within the casing 3 so as to slide in contact with the slip rings 9. A regulator 18 for regulating the magnitude of an alternating voltage caused by the stator 8 is adhered to a heat sink 17 fitted to the brush holder 11. Further, a rectifier 12 electrically connected to the stator 8 and rectifying an alternating current caused by the stator 8 to a direct current is mounted into the casing 3.

The rotor 7 has a field winding 13 which generates magnetic flux when an electric current flows therein, and a pair of rotor iron cores 20 and 21 disposed so as to cover the field winding 13 in which magnetic poles are formed by the magnetic flux generated by the field winding 13. The rotor iron cores 20 and 21 are made of iron and each has disk-shaped basic portions 22a and 23a and plural claw-shaped magnetic poles 22b and 23b projecting from outer circumferential edges of the basic portions 22a and 23a at an equiangular pitch circumferentially. Central holes are bored in the basic portions 22a and 23a. Each of the claw-shaped magnetic poles 22b and 23b is approximately formed in a trapezoidal shape projecting in a tapered shape in an axial direction. The pair of rotor iron cores 20 and 21 are fitted to the shaft 6 and are integrated with the shaft 6 by abutting end surfaces of the basic portions 22a and 23a so as to engage the claw-shaped magnetic poles 22b and 23b with each other. Further, permanent magnets 19 are fixedly attached between the claw-shaped magnetic poles 22b and 23b adjacent to each other, respectively, and are magnetized in a direction in which leakage of the magnetic flux between these claw-shaped magnetic poles 22b and 23b is reduced.

The stator 8 has a stator iron core 15 and a stator winding 16 constructed by winding a lead wire around the stator iron core 15 in which the alternating current is generated by alternating the magnetic flux from the field winding 13 owing to the rotation of the rotor 7.

In the alternator for a vehicle having such a construction, an electric current is supplied from a battery (not shown) to the rotor coil 13 by means of the brushes 10 and the slip rings 9 so that the magnetic flux is generated. The claw-shaped magnetic poles 22b of one field core 20 are magnetized to N-polarities by the magnetic flux and the claw-shaped magnetic poles 23b of the other field core 21 are magnetized to S-polarities.

In contrast to this, the rotational torque from the engine is transmitted to the shaft 6 by means of the belt and the pulley 4 so that the rotor 7 is rotated. Therefore, a rotating magnetic field is imparted to the stator winding 16 and the electromotive force is generated in the stator winding 16. This alternating electromotive force is rectified to a direct current by means of the rectifier 12, and the regulator 18 regulates its magnitude and the direct current is charged to the battery.

Most of magnetic flux generated by the field winding 13 enter the stator 8 from the claw-shaped magnetic poles 22b of the field core 20 magnetized to the N-polarities, and then enter the interior of the field core 21 from the claw-shaped magnetic poles 23b of the field core 21 magnetized to the S-polarities through the interior of the stator 8, and again enter the stator 8 from the claw-shaped magnetic poles 22b of the field core 20. Thus, the above magnetic flux constitutes a closing circuit. At this time, magnetic flux leaked from a portion between the claw-shaped magnetic poles 22b and 23b are reduced by the permanent magnets 19. Thus, invalid magnetic flux not contributing to power generation is reduced and power generation efficiency of the alternator is increased.

Since the rotor 8 of this conventional alternator for a vehicle is constructed as mentioned above, the magnetic attractive force is applied to the claw-shaped magnetic poles 22b and 23b by the magnetic flux in gaps between the claw-shaped magnetic poles 22b and 23b and the stator 8 during an operation of the alternator for a vehicle. This magnetic flux is continuously changed with the passage of time, and the magnetic attractive force is applied to the claw-shaped magnetic poles 22b and 23b as swinging force. Thus, as shown by an arrow in FIG. 14, a problem exists in that the claw-shaped magnetic poles 22b and 23b are swung, i.e., resonated so that uncomfortable noises (electromagnetic noises) are caused and heard.

Figure 14:
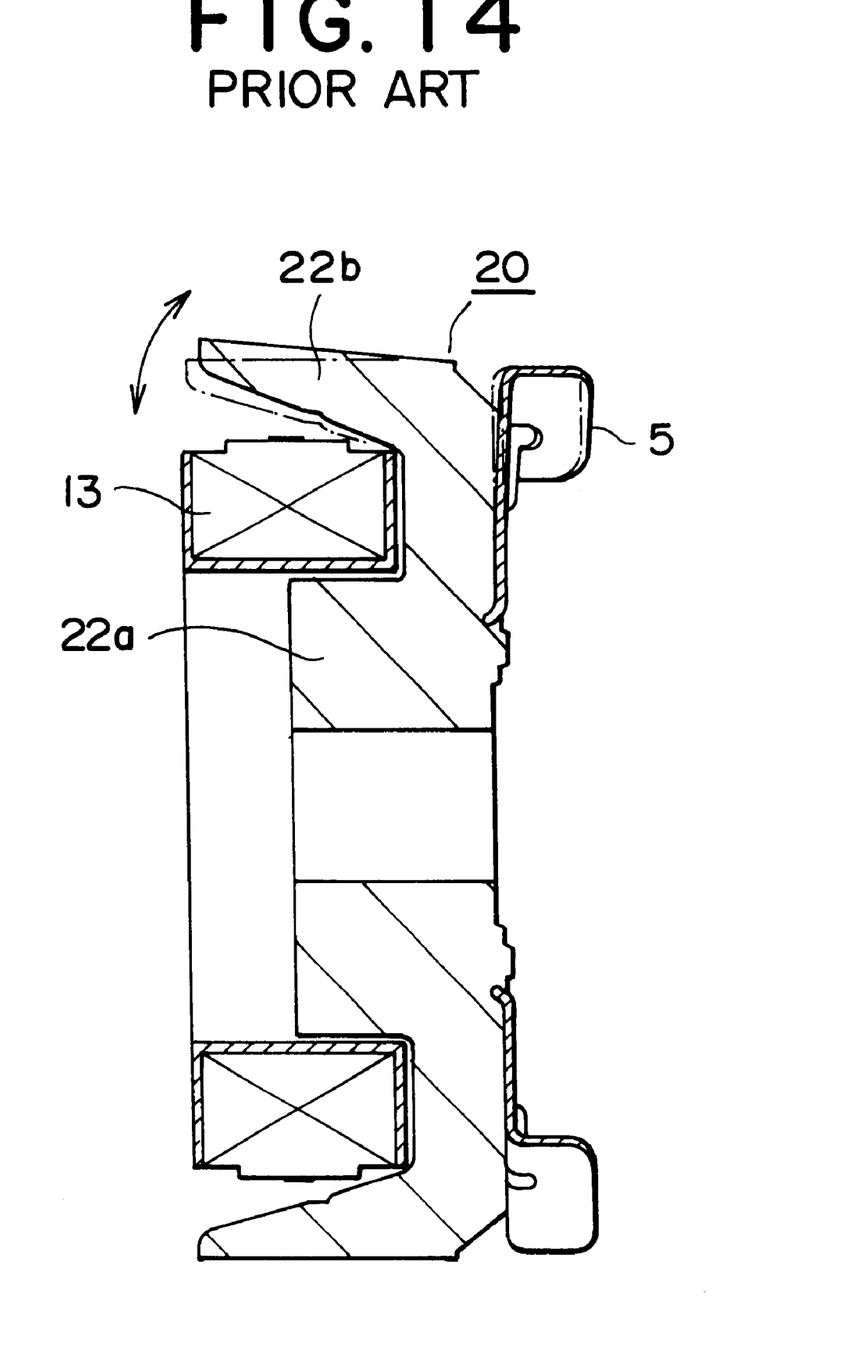
FIG. 14 is a cross-sectional view for explaining the behavior of the rotor in the conventional alternator for a vehicle.

Further, the claw-shaped magnetic poles 22b and 23b are vibrated by the magnetic attractive force with large amplitude as it approaches tip sides of the claw-shaped magnetic poles 22b and 23b. The claw-shaped magnetic poles 22b and 23b are mutually vibrated in reverse phases. In the conventional rotor 8, the permanent magnets 19 are fixedly attached to the claw-shaped magnetic poles 22b and 23b and are constructed as an integral body. Accordingly, a problem also exists in that there is a fear that the permanent magnets 19 fixedly attached to the claw-shaped magnetic poles 22b and 23b are distorted and damaged by such vibration of the claw-shaped magnetic poles 22b and 23b.

For example, improving measures for preventing such damage of the permanent magnets are proposed in Japanese Patent Application Laid-Open No. Hei 11-136913. In these improving measures, each permanent magnet interposed between the claw-shaped magnetic poles adjacent to each other is divided into two permanent magnet pieces, and the divided permanent magnet pieces are respectively directly fixedly attached to the adjacent claw-shaped magnetic poles, or are respectively fixedly attached to the adjacent claw-shaped magnetic poles by using supporting members.

However, in such improving measures, strength of the magnet is secured, but these improving measures are not positively taken to reduce the resonance of each of the claw-shaped magnetic poles. Accordingly, no improving measures contribute to a reduction in displacement of each of the claw-shaped magnetic poles so that no uncomfortable noises can be reduced. Further, when the permanent magnet pieces are fixedly attached to the claw-shaped magnetic poles by using the supporting members, the supporting members, the permanent magnet pieces and the claw-shaped magnetic poles are integrated with each other so that only volume is simply increased. Therefore, the vibration of the claw-shaped magnetic poles is ununiformly dispersed by rotation so that there is also a fear that the rasping noises become bigger. Further, the alternator is set to a state in which weight is loaded while no displacement of the claw-shaped magnetic poles is reduced. Therefore, there is also a fear that strength improvement of the permanent magnet pieces using the supporting members becomes imperfect at a high speed rotating time.

SUMMARY OF THE INVENTION

To solve the above-mentioned problems, an object of the present invention is to obtain a rotor for an alternator enabling supporting strength of the magnet to be secured, enabling resonance of the claw-shaped magnetic poles to be suppressed and enabling uncomfortable noises to be reduced by constructing a multidegree of freedom vibrating system which is composed of a reinforcing body fixedly attaching a magnet thereto and the claw-shaped magnetic poles by devising an attaching structure of the reinforcing body fixedly attaching the magnet thereto to the claw-shaped magnetic poles.

In order to achieve the above object, according to one aspect of the present invention, there is provided a rotor for an alternator, including:

a pair of rotor iron cores in which plural claw-shaped magnetic poles each approximately formed in a trapezoidal shape are arranged in outer circumferential portions of disk-shaped basic portions at given intervals in a circumferential direction, the rotor iron cores being fitted to a shaft and being integrated with the shaft by abutting these basic portions so as to engage the claw-shaped magnetic poles with each other;

an exciting winding wound around the basic portions for generating magnetic flux by flowing an exciting electric current;

plural reinforcing bodies each approximately formed in a U-shape having wing portions arranged in both side portions of an attaching portion of a flat plate shape, and disposed such that the attaching portion faces to each of inner circumferential wall surfaces of the claw-shaped magnetic poles and the wing portions are located on both sides of the claw-shaped magnetic poles in the circumferential direction; and plural magnets each fixedly attached to both wing portions of each of the reinforcing bodies and disposed on both sides of the claw-shaped magnetic poles in the circumferential direction, for reducing leaked magnetic flux between the claw-shaped magnetic poles adjacent to each other, wherein a multidegree of freedom vibrating system composed of the claw-shaped magnetic poles and the reinforcing bodies fixedly attaching the magnets thereto is constructed by attaching each of the reinforcing bodies in a state in which at least one portion of the attaching portion is fixedly attached to the inner circumferential wall surfaces of each of the claw-shaped magnetic poles.

According to another aspect of the present invention, there is provided a rotor for an alternator, including:

a pair of rotor iron cores in which plural claw-shaped magnetic poles each approximately formed in a trapezoidal shape are arranged in outer circumferential portions of disk-shaped basic portions at given intervals in a circumferential direction, the rotor iron cores being fitted to a shaft and being integrated with the shaft by abutting these basic portions so as to engage the claw-shaped magnetic poles with each other;

an exciting winding wound around the basic portions for generating magnetic flux by flowing an exciting electric current;

plural reinforcing bodies each approximately formed in a U-shape having wing portions arranged in both side portions of an attaching portion of a flat plate shape, and disposed such that the attaching portion faces to each of inner circumferential wall surfaces of the claw-shaped magnetic poles and the wing portions are located on both sides of the claw-shaped magnetic poles in the circumferential direction; and plural magnets each fixedly attached to both wing portions of each of the reinforcing bodies and disposed on both sides of the claw-shaped magnetic poles in the circumferential direction, for reducing leaked magnetic flux between the claw-shaped magnetic poles adjacent to each other, wherein a multidegree of freedom vibrating system composed of the claw-shaped magnetic poles and the reinforcing bodies fixedly attaching the magnets thereto is constructed by attaching each of the reinforcing bodies in a state in which at least one portion of the attaching portion is pressed against the inner circumferential wall surfaces of each of the claw-shaped magnetic poles by press-fitting a ring-shaped interposing object to an inner circumferential side of each of the attaching portions.

DETAILED DESCRIPTION OF THE PREFERRED EMBODIMENTS

Embodiments of the present invention will next be explained with reference to the drawings.

Embodiment 1

Figure 1:
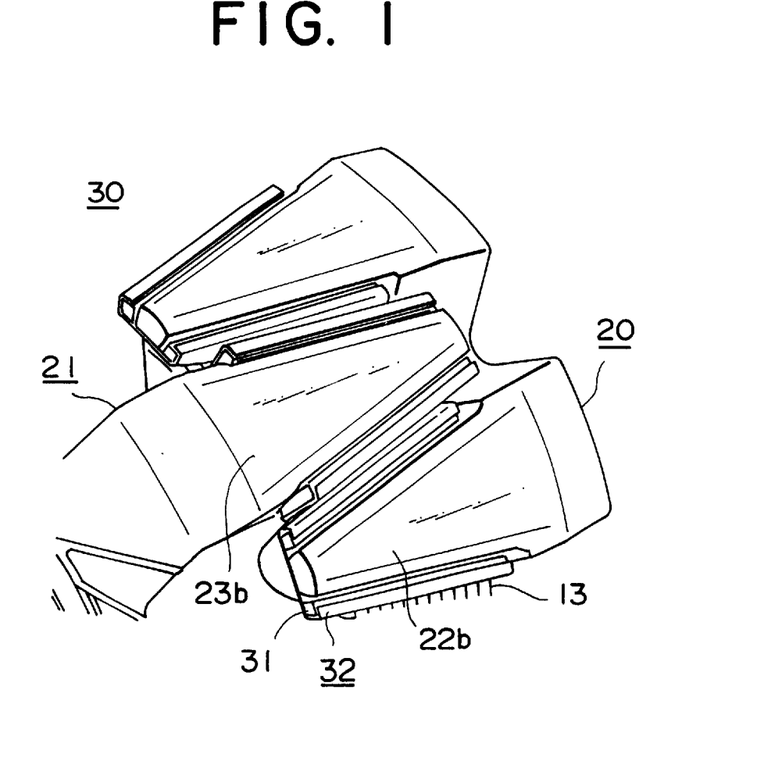
FIG. 1 is a perspective view showing a main portion of a rotor for an alternator in accordance with Embodiment 1 of the present invention.
Figure 2:
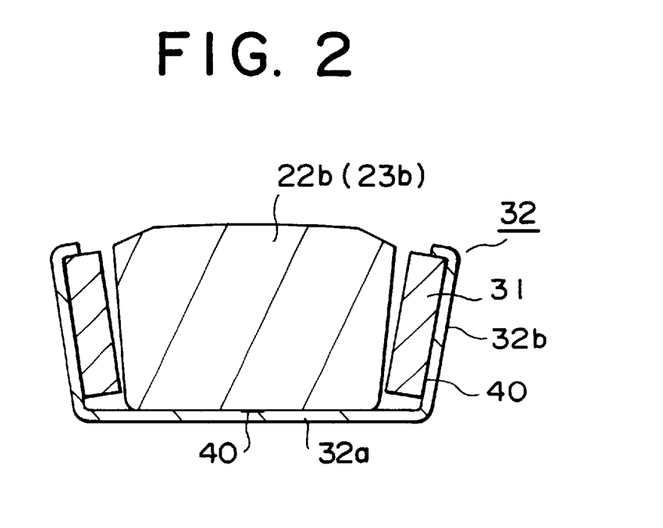
FIG. 2 is a cross-sectional view showing the main portion of the rotor for the alternator in accordance with Embodiment 1 of the present invention.
Figure 3:
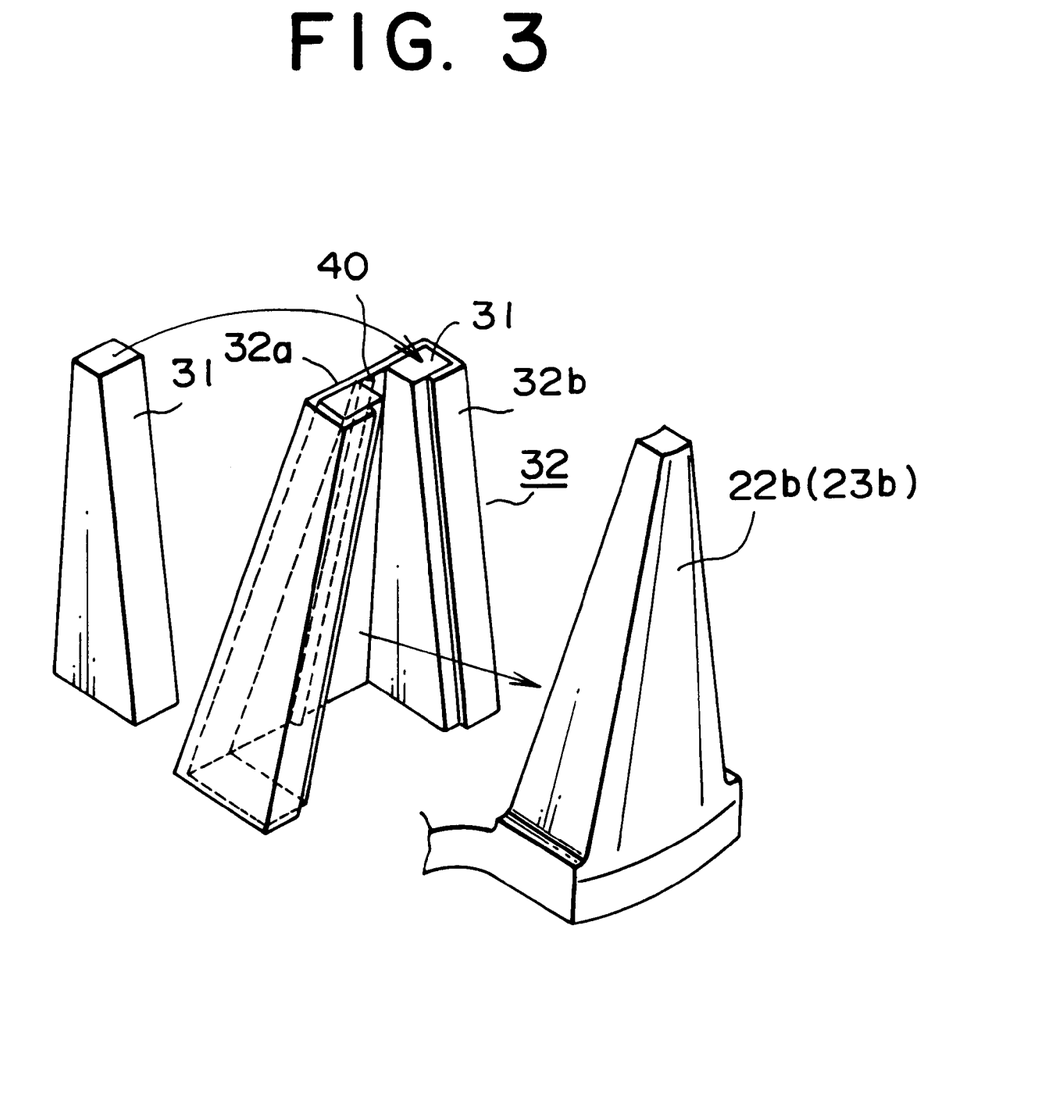
FIG. 3 is a perspective view for explaining an attaching structure of a magnet in the rotor for the alternator in accordance with Embodiment 1 of the present invention.
Figure 4:
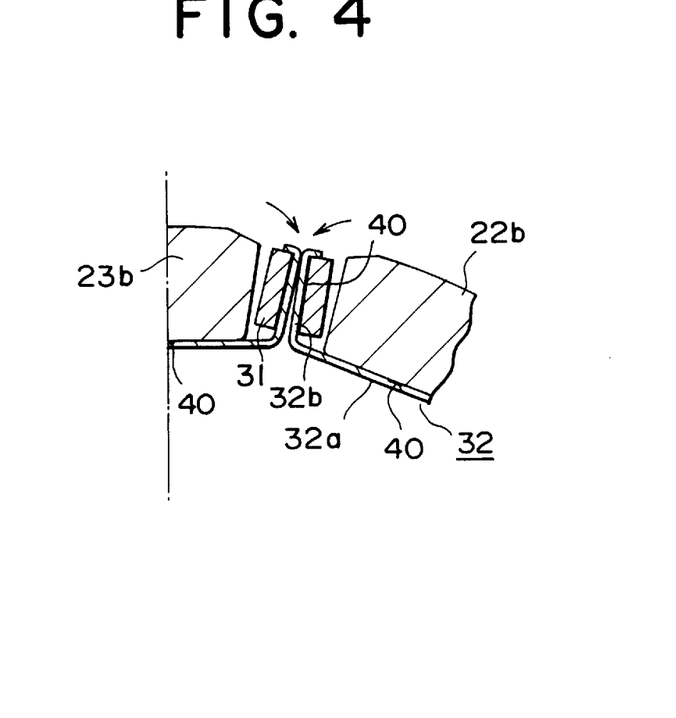
FIG. 4 is a cross-sectional view for explaining the behavior of a claw-shaped magnetic pole portion in the rotor for the alternator in accordance with Embodiment 1 of the present invention.

FIG. 1 is a perspective view showing a main portion of a rotor for an alternator in accordance with Embodiment 1 of the present invention. FIG. 2 is a cross-sectional view showing the main portion of the rotor for the alternator in accordance with Embodiment 1 of the present invention. FIG. 3 is a perspective view for explaining an attaching structure of a magnet in the rotor for the alternator in accordance with Embodiment 1 of the present invention. FIG. 4 is a cross-sectional view for explaining the behavior of a claw-shaped magnetic pole portion in the rotor for the alternator in accordance with Embodiment 1 of the present invention. In these figures, portions equal to or corresponding to those of the conventional rotor shown in FIGS. 12 and 13 are designated by the same reference numerals and their explanations are omitted here.

In FIGS. 1 and 2, a rotor 30 has a field winding 13 which generates magnetic flux when an electric current flows therein, and a pair of rotor iron cores 20 and 21 disposed so as to cover the field winding 13 in which magnetic poles are formed by the magnetic flux generated by the field winding 13. The rotor 30 also has permanent magnets 31 for reducing a leaked magnetic flux and reinforcing bodies 32 for fixedly supporting the permanent magnets 31.

The rotor iron cores 20 and 21 are similar to the rotor iron cores in the conventional rotor 7. The rotor iron cores 20 and 21 are made of iron and each has disk-shaped basic portions 22a and 23a and plural claw-shaped magnetic poles 22b and 23b projecting from outer circumferential edges of the basic portions 22a and 23a at an equiangular pitch circumferentially. Central holes are bored in the basic portions 22a and 23a. Each of the claw-shaped magnetic poles 22b and 23b is approximately formed in a trapezoidal shape projecting in a tapered shape in an axial direction. The pair of rotor iron cores 20 and 21 are fitted to the shaft 6 and are integrated with the shaft 6 by abutting end surfaces of the basic portions 22a and 23a so as to engage the claw-shaped magnetic poles 22b and 23b with each other.

Each of the permanent magnets 31 is made in a rectangular parallelepiped shape having a side face shape approximately conforming to a side face shape of each of the claw-shaped magnetic poles 22b, 23b.

For example, each of the reinforcing bodies 32 is formed in an opening U-shape by bending a metallic plate of stainless steel, etc. Each of the reinforcing bodies 32 has an attaching portion 32a of a flat plate shape and wing portions 32b arranged in each of both side portions of the attaching portion 32a. Each wing portion 32b is bent at its tip on an inner circumferential side and is approximately formed in a C-shape and constitutes a supporting portion of the permanent magnet 31. Both wing portions 32b extend to both sides of the claw-shaped magnetic poles 22b and 23b in the circumferential direction and a central portion of the attaching portion 32a in the circumferential direction is fixedly attached to each of inner circumferential wall surfaces of the claw-shaped magnetic poles 22b and 23b by resin 40 such as epoxy resin so that the reinforcing bodies 32 are attached to the claw-shaped magnetic poles 22b and 23b.

An attaching structure of the permanent magnet 31 using the reinforcing body 32 will next be explained with reference to FIG. 3.

The permanent magnet 31 coated with the resin 40 is inserted into each of both wing portions 32b and is stuck to an inner wall surface of each wing portion 32b. Next, the central portion of the attaching portion 32a in the circumferential direction is coated with the resin 40. The attaching portion 32a is stuck to each of the inner circumferential wall surfaces of the claw-shaped magnetic poles 22b and 23b such that both wing portions 32b are located on both sides of the claw-shaped magnetic poles 22b and 23b in the circumferential direction. Thereafter, the resin 40 is heated and hardened and the reinforcing bodies 32 are fixedly attached to the claw-shaped magnetic poles 22b and 23b.

In the rotor 30 constructed in this way, the permanent magnet 31 is fixedly attached to each wing portion 32b and the central portion of the attaching portion 32a of the reinforcing body 32 in the circumferential direction is fixedly attached to each of the inner circumferential wall surfaces of the claw-shaped magnetic poles 22b and 23b by the resin 40, and the reinforcing body 32 is attached to each of the claw-shaped magnetic poles 22b and 23b with gaps except for this attaching portion. Thus, the reinforcing body 32 can be freely vibrated integrally with the permanent magnet 31 with respect to the claw-shaped magnetic poles 22b and 23b with the fixing portion as a center. Namely, claw-shaped magnetic pole portions constitute a multidegree of freedom vibrating system constructed by the reinforcing bodies 32 fixedly attaching the permanent magnet 31 thereto and the claw-shaped magnetic poles 22b and 23b. Each of the reinforcing bodies 32 is displaceably constructed at a vibrating time such that the adjacent wing portions 32b come in contact with each other.

Therefore, in the alternator for a vehicle mounting the rotor 30 instead of the conventional rotor 7, when the claw-shaped magnetic poles 22b and 23b are resonated during an operation of the alternator, the reinforcing body 32 integrated with the permanent magnet 31 is freely vibrated with the fixing portion of the resin 40 as a center and effects similar to a damper are caused so that the resonance of the claw-shaped magnetic poles 22b and 23b is damped by these effects. Thus, rasping noises caused by the resonance of the claw-shaped magnetic poles 22b and 23b are reduced. At this time, since the permanent magnet 31 is fixedly attached to the claw-shaped magnetic poles 22b and 23b through the reinforcing body 31, no stress caused by the vibration of the claw-shaped magnetic poles 22b and 23b is applied to the permanent magnet 31. Accordingly, a damage accident of the permanent magnet 31 can be prevented in advance.

The reinforcing body 32 is displaced by moment of centrifugal force and the adjacent wing portions 32b come in contact with each other as shown in FIG. 4. At this time, since the claw-shaped magnetic poles 22b and 23b are swung in reverse phases, the adjacent wing portions 32b are mutually slid so that contact frictional damping effects are caused and the resonance of the claw-shaped magnetic poles 22b and 23b is damped by these effects. Thus, the rasping noises caused by the resonance of the claw-shaped magnetic poles 22b and 23b are further reduced.

Further, the permanent magnet 31 is disposed as a pair on both sides of the claw-shaped magnetic poles 22b and 23b in the circumferential direction. Namely, the permanent magnet 31 is disposed between the adjacent claw-shaped magnetic poles 22b and 23b. Accordingly, leaked magnetic flux is reduced between the claw-shaped magnetic poles 22b and 23b, and power generation efficiency of the alternator is enhanced.

Further, since each of the reinforcing bodies 32 is attached to the claw-shaped magnetic poles 22b and 23b with gaps except for the fixing portion, no heat from the claw-shaped magnetic poles 22b and 23b is easily transmitted to each of the reinforcing bodies 32. Further, gap portions between the reinforcing bodies 32 and the claw-shaped magnetic poles 22b and 23b become a flowing path for the cooling air so that an elevation of temperature of the permanent magnet 31 is suppressed. Thus, a reduction in magnetic force caused by the elevation of temperature of the permanent magnet 31 is suppressed.

The wing portions 32b surround three faces of the permanent magnet 31 and the remaining one face of the permanent magnet 31 faces the claw-shaped magnetic poles 22b and 23b. Thus, no permanent magnet 31 has a large exposed face and no impact is easily applied from the exterior to the permanent magnet 31 so that durability is improved and magnet defect accidents at an assembly time are reduced.

Further, no reinforcing body 32 exists in a portion facing the claw-shaped magnetic poles 22b and 23b of the permanent magnet 31 so that a size of the permanent magnet 31 can be increased for a thickness of the reinforcing body 32 and output can be increased.

It is not necessary to form the attaching portion 32a of the reinforcing body 32 so as to cover an entire inner circumferential wall surface of each of the claw-shaped magnetic poles 22b and 23b. It is sufficient for the attaching portion 32a to have strength able to secure holding of the permanent magnet 31. For example, it is sufficient for the attaching portion 32a to have a half size or more of each inner circumferential wall surface in the axial direction.

The central portion of the attaching portion 32a in the circumferential direction is fixedly attached to each of the inner circumferential wall surfaces of the claw-shaped magnetic poles 22b and 23b by the resin 40. However, an entire surface of the attaching portion 32a may be fixedly attached to the inner circumferential wall surfaces of the claw-shaped magnetic poles 22b and 23b by the resin 40, or the attaching portion 32a may be partially fixedly attached to the inner circumferential wall surfaces of the claw-shaped magnetic poles 22b and 23b by the resin 40 coated in an insular shape.

Embodiment 2

Figure 5:
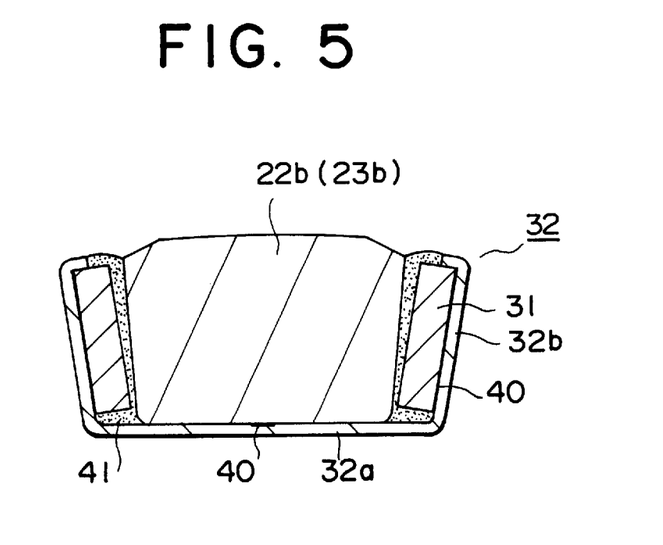
FIG. 5 is a cross-sectional view showing a main portion of a rotor for an alternator in accordance with Embodiment 2 of the present invention.

In Embodiment 2, as shown in FIG. 5, resin 41 having elasticity, such as resin of silicone rubbers, is filled between each reinforcing body 32 fixedly attaching a permanent magnet 31 thereto and claw-shaped magnetic poles 22b and 23b. The other constructions are similar to those in Embodiment 1.

In accordance with Embodiment 2, collisions between a reinforcing body 32 and the claw-shaped magnetic poles 22 band 23b and between the permanent magnet 31 and the claw-shaped magnetic poles 22b and 23b caused by vibration and displacement of the reinforcing body 32 are avoided. Accordingly, abnormal sounds and impact sounds caused by these collisions are not caused. Further, it is possible to prevent foreign matters from entering clearances between the reinforcing body 32 fixedly attaching the permanent magnet 31 thereto and the claw-shaped magnetic poles 22b and 23b.

Since the resin 41 has elasticity, no resonant damping effects of the claw-shaped magnetic poles 22b and 23b in Embodiment 1 are reduced.

Embodiment 3

Figure 6:
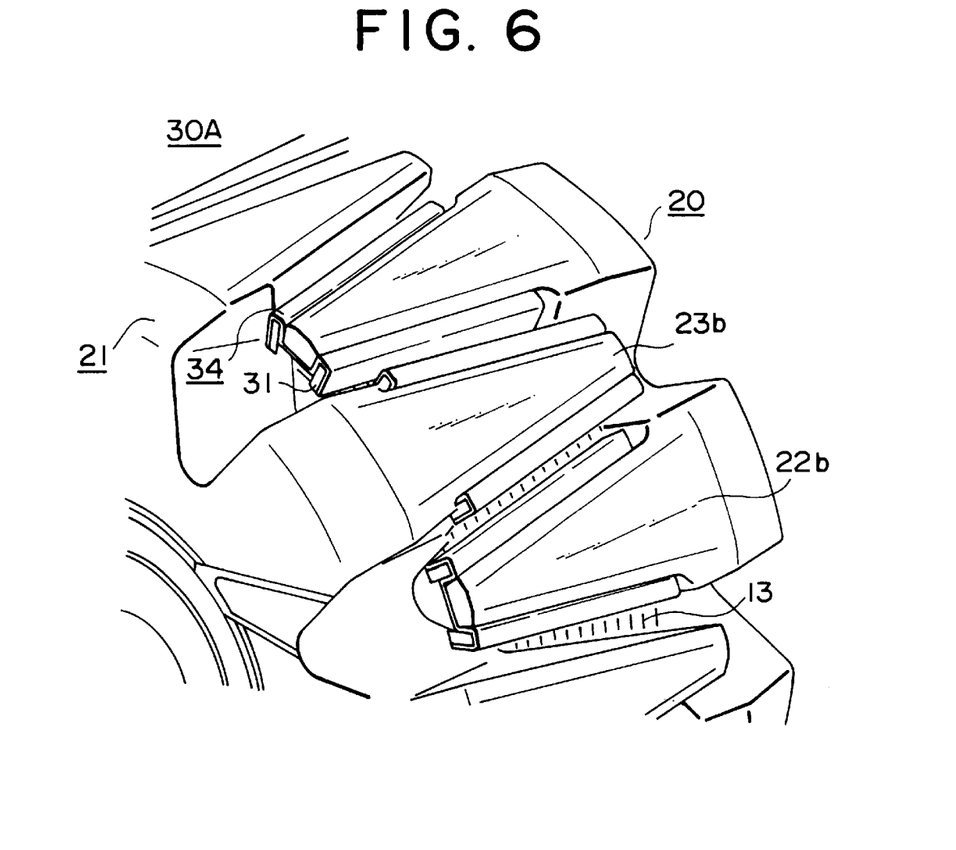
FIG. 6 is a perspective view showing a main portion of a rotor for an alternator in accordance with Embodiment 3 of the present invention.
Figure 7:
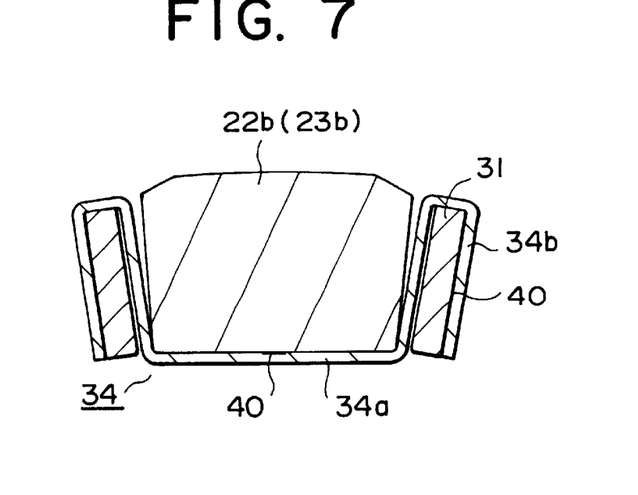
FIG. 7 is a cross-sectional view showing the main portion of the rotor for the alternator in accordance with Embodiment 3 of the present invention.

FIG. 6 is a perspective view showing a main portion of a rotor for an alternator in accordance with Embodiment 3 of the present invention. FIG. 7 is a cross-sectional view showing the main portion of the rotor for the alternator in accordance with Embodiment 3 of the present invention.

In FIGS. 6 and 7, for example, each reinforcing body 34 is formed in an opening U-shape by bending a metallic plate of stainless steel, etc. The reinforcing body 34 has an attaching portion 34a of a flat plate shape and wing portions 34b formed in both side portions of the attaching portion 34a. Each wing portion 34b is folded back at its tip and is approximately formed in a U-shape and constitutes a supporting portion of a permanent magnet 31. Both wing portions 34b extend on both sides of the claw-shaped magnetic poles 22b and 23b in a circumferential direction, and a central portion of the attaching portion 34a in the circumferential direction is fixedly attached to each of inner circumferential wall surfaces of the claw-shaped magnetic poles 22b and 23b by resin 40 such as epoxy resin so that the reinforcing body 34 is attached to the claw-shaped magnetic poles 22b and 23b. One face of the permanent magnet 31 on its outer side in the circumferential direction is fixedly attached to an inner wall surface of each of the wing portions 34b by the resin 40.

In a rotor 30A having such a construction, the permanent magnet 31 is fixedly attached to each wing portion 34b, and the central portion of the attaching portion 34a of the reinforcing body 34 in the circumferential direction is fixedly attached to each of the inner circumferential wall surfaces of the claw-shaped magnetic poles 22b and 23b by the resin 40. Further, this reinforcing body 34 is attached to the claw-shaped magnetic poles 22b and 23b with gaps except for this fixing portion. Thus, the reinforcing body 34 can be freely vibrated integrally with the permanent magnet 31 with respect to the claw-shaped magnetic poles 22b and 23b with the fixing portion as a center. Namely, claw-shaped magnetic pole portions constitute a multidegree of freedom vibrating system constructed by the reinforcing body 34 fixedly attaching the permanent magnet 31 thereto and the claw-shaped magnetic poles 22b and 23b. The reinforcing body 34 is displaceably constructed at a vibrating time such that the adjacent wing portions 34b come in contact with each other.

Three surfaces of the permanent magnet 31 are surrounded by the wing portions 34b and the remaining one surface faces the basic portions 22a and 23a so that there is no large exposed face.

Accordingly, effects similar to those in Embodiment 1 are also obtained in Embodiment 3.

In Embodiment 3, both surfaces of the permanent magnet 31 in the circumferential direction are covered with the wing portions 34b. Therefore, a size of the permanent magnet 31 is reduced by a thickness of the reinforcing body 34 in comparison with Embodiment 1. However, direct collisions between the permanent magnet 31 and the claw-shaped magnetic poles 22b and 23b and between the permanent magnet 31 and the adjacent wing portions 34b caused by vibration and displacement of the reinforcing body 34 are avoided so that defect accidents of the permanent magnet are restrained.

Figure 8:
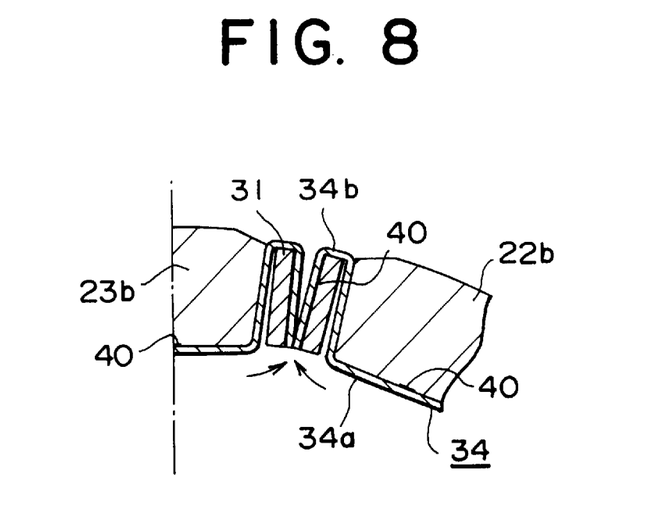
FIG. 8 is a cross-sectional view for explaining the behavior of a claw-shaped magnetic pole portion in the rotor for the alternator in accordance with Embodiment 3 of the present invention.
Figure 9:
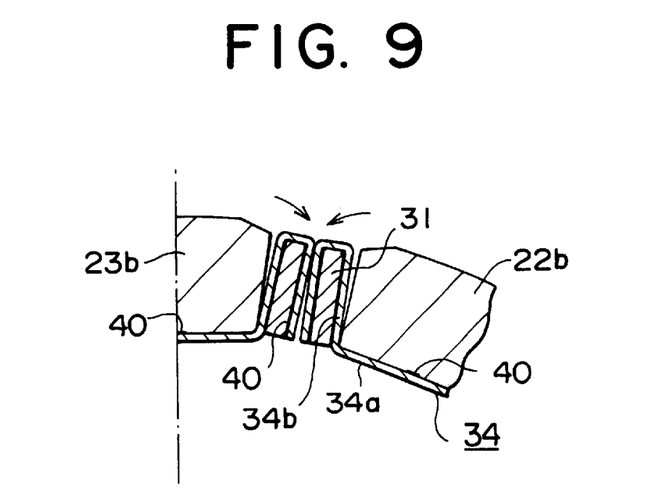
FIG. 9 is a cross-sectional view for explaining the behavior of the claw-shaped magnetic pole portion in the rotor for the alternator in accordance with Embodiment 3 of the present invention.

The reinforcing body 34 is displaced by moment of centrifugal force and the adjacent wing portions 34b come in contact with each other as shown in FIGS. 8 and 9. The wing portions 34b and the claw-shaped magnetic poles 22b and 23b also come in contact with each other. Further, the permanent magnet 31 and inner wall surfaces of the wing portions 34b opposed to the permanent magnet 31 come in contact with each other. At this time, since the claw-shaped magnetic poles 22b and 23b are swung in reverse phases, the respective contact members are mutually slid and contact frictional damping effects are caused and resonance of the claw-shaped magnetic poles 22b and 23b is damped by these effects. Thus, rasping noises caused by the resonance of the claw-shaped magnetic poles 22b and 23b are further reduced.

In Embodiment 3, resin 41 may be filled between the permanent magnet 31, the reinforcing body 32 and the claw-shaped magnetic poles 22b and 23b. In this case, effects similar to those in Embodiment 2 are obtained.

Embodiment 4

Figure 10:
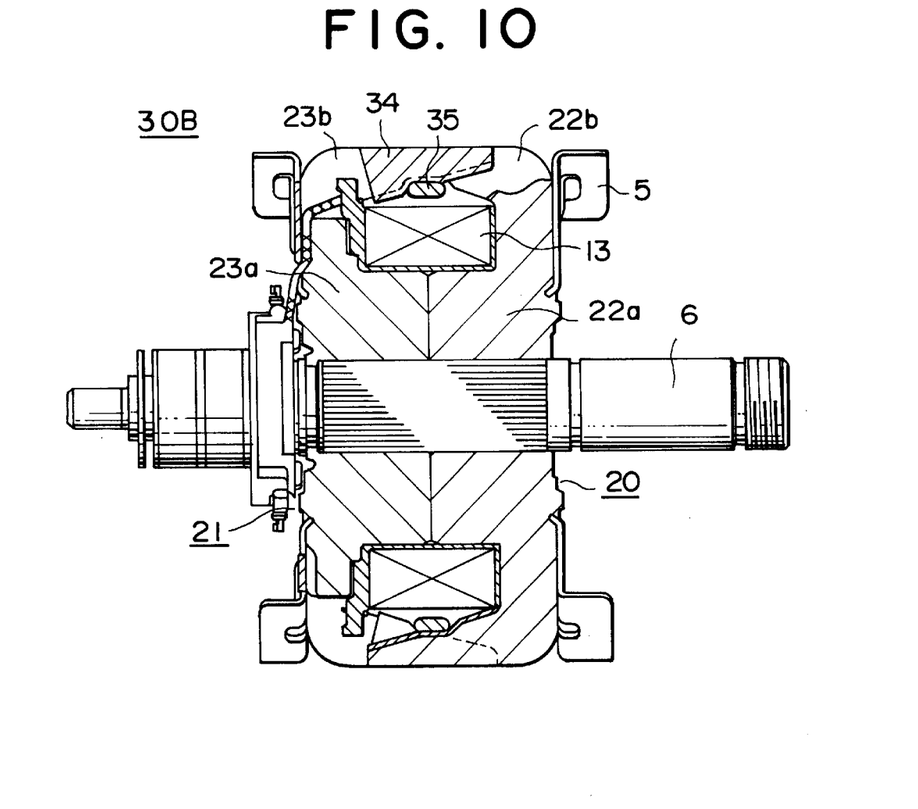
FIG. 10 is a cross-sectional view showing a rotor for an alternator in accordance with Embodiment 4 of the present invention.
Figure 11:
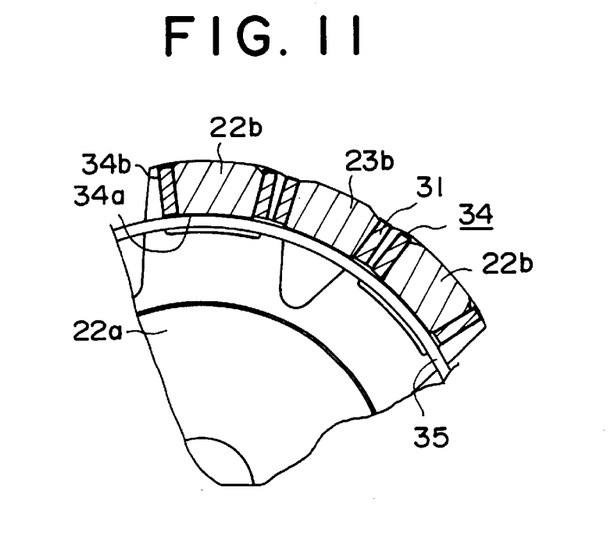
FIG. 11 is a cross-sectional view showing a main portion of the rotor for the alternator in accordance with Embodiment 4 of the present invention.

FIG. 10 is a cross-sectional view showing a rotor for an alternator in accordance with Embodiment 4 of the present invention. FIG. 11 is a cross-sectional view showing a main portion of the rotor for the alternator in accordance with Embodiment 4 of the present invention.

In FIGS. 10 and 11, for example, a ring-shaped interposing object 35 made of stainless steel is press-fitted to the inner circumferential side of an attaching portion 34a of each reinforcing body 34 arranged in a circumferential direction. Thus, the attaching portion 34a of each reinforcing body 34 is pressed against inner circumferential wall surfaces of the claw-shaped magnetic poles 22b and 23b and the reinforcing bodies 34 are attached to the claw-shaped magnetic poles 22b and 23b.

The other constructions are similar to those in Embodiment 3.

In a rotor 30B in Embodiment 4, at least one portion of the attaching portion 34a of each reinforcing body 34 is fixedly attached to each of the inner circumferential wall surfaces of the claw-shaped magnetic poles 22b and 23b by press-fitting force of the ring-shaped interposing object 35. Thus, the reinforcing body 34 can be freely vibrated with respect to the claw-shaped magnetic poles 22b and 23b with a fixing portion as a center. Namely, claw-shaped magnetic pole portions constitute a multidegree of freedom vibrating system constructed by the reinforcing body 34 fixedly attaching the permanent magnet 31 thereto, the ring-shaped interposing object 35 and the claw-shaped magnetic poles 22b and 23b.

Accordingly, effects similar to those in Embodiment 3 are also obtained in Embodiment 4.

In Embodiment 4, the ring-shaped interposing object 35 and the reinforcing bodies 34 fixedly attached to the claw-shaped magnetic poles 22b and 23b and displaced come in frictional contact with each other so that the vibration of the reinforcing body 34, i.e., vibration of the claw-shaped magnetic poles 22b and 23b is damped.

Further, since the reinforcing body 34 can be reliably held in a state in which the reinforcing body 34 is attached to the claw-shaped magnetic poles 22b and 23b, it is excellent to subsequently carry the rotor. Further, the reinforcing body 34 can be simplified in construction since the reinforcing bodies 34 can be simultaneously held with respect to the plural claw-shaped magnetic poles 22b and 23b.

Here, the ring-shaped interposing object 35 may be formed in a rectangular shape in section, and an inclination conforming to an axial inclination of each of the inner circumferential wall surfaces of the claw-shaped magnetic poles 22b and 23b may be also formed on an outer circumferential side.

Further, the attaching portion 34a of the reinforcing body 34 and the claw-shaped magnetic poles 22b and 23b may be fixedly attached to each other by resin 40 and this resin 40 may be also omitted. If the resin is formed between the attaching portion 34a and the claw-shaped magnetic poles 22b and 23b, adhesive surfaces of both these members come in close contact with each other by the press-fitting force of the ring-shaped interposing object 35. Accordingly, no additional jig is required at an assembly time and adhesive strength is secured.

Further, resin 41 having elasticity may be interposed between the ring-shaped interposing object 35 and the reinforcing bodies 34. In this case, the resin 41 having elasticity functions as a damper and the vibration of the claw-shaped magnetic poles 22b and 23b is further damped.

In each of the above embodiments, the reinforcing bodies 32, 34 are fixedly attached to the claw-shaped magnetic poles 22b and 23b by the resin 40, but the reinforcing bodies 32 and 34 may be also fixedly attached to the claw-shaped magnetic poles 22b and 23b by welding. In particular, in the case of projection welding, the reinforcing bodies 32 and 34 are manufactured from a thin plate so that a concave projection is easily formed and working property is improved.

Since the present invention is constructed as mentioned above, the following effects are obtained.

In accordance with the present invention, a rotor for an alternator comprises:

a pair of rotor iron cores in which plural claw-shaped magnetic poles each approximately formed in a trapezoidal shape are arranged in outer circumferential portions of disk-shaped basic portions at given intervals in a circumferential direction, the rotor iron cores being fitted to a shaft and being integrated with the shaft by abutting these basic portions so as to engage the claw-shaped magnetic poles with each other;

an exciting winding wound around the basic portions for generating magnetic flux by flowing an exciting electric current;

plural reinforcing bodies each approximately formed in a U-shape having wing portions arranged in both side portions of an attaching portion of a flat plate shape, and disposed such that the attaching portion faces to each of inner circumferential wall surfaces of the claw-shaped magnetic poles and the wing portions are located on both sides of the claw-shaped magnetic poles in the circumferential direction; and plural magnets each fixedly attached to both wing portions of each of the reinforcing bodies and disposed on both sides of the claw-shaped magnetic poles in the circumferential direction, for reducing leaked magnetic flux between the claw-shaped magnetic poles adjacent to each other, wherein a multidegree of freedom vibrating system composed of the claw-shaped magnetic poles and the reinforcing bodies fixedly attaching the magnets thereto is constructed by attaching each of the reinforcing bodies in a state in which at least one portion of the attaching portion is fixedly attached to the inner circumferential wall surfaces of each of the claw-shaped magnetic poles. Accordingly, it is possible to obtain a rotor for an alternator able to suppress resonance of the claw-shaped magnetic poles and reduce uncomfortable noises while supporting strength of the magnets is secured.

Further, a rotor for an alternator also may comprise:

a pair of rotor iron cores in which plural claw-shaped magnetic poles each approximately formed in a trapezoidal shape are arranged in outer circumferential portions of disk-shaped basic portions at given intervals in a circumferential direction, the rotor iron cores being fitted to a shaft and being integrated with the shaft by abutting these basic portions so as to engage the claw-shaped magnetic poles with each other;

an exciting winding wound around the basic portions for generating magnetic flux by flowing an exciting electric current;

plural reinforcing bodies each approximately formed in a U-shape having wing portions arranged in both side portions of an attaching portion of a flat plate shape, and disposed such that the attaching portion faces to each of inner circumferential wall surfaces of the claw-shaped magnetic poles and the wing portions are located on both sides of the claw-shaped magnetic poles in the circumferential direction; and plural magnets each fixedly attached to both wing portions of each of the reinforcing bodies and disposed on both sides of the claw-shaped magnetic poles in the circumferential direction, for reducing leaked magnetic flux between the claw-shaped magnetic poles adjacent to each other, where in a multidegree of freedom vibrating system composed of the claw-shaped magnetic poles and the reinforcing bodies fixedly attaching the magnets thereto is constructed by attaching each of the reinforcing bodies in a state in which at least one portion of the attaching portion is pressed against the inner circumferential wall surfaces of each of the claw-shaped magnetic poles by press-fitting a ring-shaped interposing object to an inner circumferential side of each of the attaching portions. Accordingly, it is possible to obtain a rotor for an alternator able to suppress resonance of the claw-shaped magnetic poles and reduce uncomfortable noises while supporting strength of the magnets is secured.

Further, resin having elasticity may be interposed between the attaching portions and the ring-shaped interposing object. Accordingly, the resin having elasticity functions as a damper and the resonance of the claw-shaped magnetic poles can be damped.

Further, the wing portions may be approximately formed in a C-shape opened to sides of the claw-shaped magnetic poles, and the magnets are fixedly attached to inner wall surfaces of the wing portions. Accordingly, exposed faces of the magnets are reduced and the generation of defects of the magnets is suppressed.

Further, the wing portions may be approximately formed in a U-shape opened to sides of the basic portions, and the magnets are fixedly attached to inner wall surfaces of the wing portions. Accordingly, exposed surfaces of the magnets are extremely reduced and the generation of defects of the magnets is suppressed.

Further, the wing portions and the magnets may be spaced from the claw-shaped magnetic poles. Accordingly, since no heat from the claw-shaped magnetic poles is easily transmitted to the reinforcing bodies, a reduction in magnetic force caused by the elevation of temperature of the magnet is suppressed.

Further, resin having elasticity may be filled between the reinforcing bodies and the claw-shaped magnetic poles and between the magnets and the claw-shaped magnetic poles. Accordingly, since collisions between the reinforcing bodies and the claw-shaped magnetic poles and between the magnets and the claw-shaped magnetic poles are avoided, abnormal sounds and impact sounds caused by these collisions are not caused.

Further, the reinforcing bodies may be displaceably constructed at a vibrating time such that the adjacent wing portions come in contact with each other. Accordingly, since the adjacent wing portions are mutually slid so that contact frictional damping effects are caused, the resonance of the claw-shaped magnetic poles is damped by these effects.

What is claimed is:

1. A rotor for an alternator, comprising:

a pair of rotor iron cores, in which plural claw-shaped magnetic poles, each approximately formed in a trapezoidal shape, are arranged in outer circumferential portions of disk-shaped basic portions at given intervals in a circumferential direction, said rotor iron cores being fitted to a shaft and being integrated with the shaft by abutting these basic portions so as to interdigitate the claw-shaped magnetic poles with each other;

a winding would around said basic portions for generating magnetic flux by the flow of an exciting current;

plural reinforcing bodies, each approximately formed in a U-shape, and having wing portions arranged at both sides of an attaching portion having a flat plate shape, and disposed such that the attaching portion faces an inner circumferential wall surface of one of said claw-shaped magnetic poles, said wing portions being located on either side of said claw-shaped magnetic pole in the circumferential direction; and plural magnets, each fixedly attached to a wing portion of each of said reinforcing bodies and disposed on either side of said claw-shaped magnetic pole in the circumferential direction, for reducing magnetic flux leakage between claw-shaped magnetic poles, wherein a multidegree of freedom vibrating system composed of said claw-shaped magnetic poles and said reinforcing bodies having said magnets fixedly attached thereto, wherein said attaching portion of each of said reinforcing bodies is fixedly attached to the inner circumferential wall surface of an associated claw-shaped magnetic pole.

2. A rotor for an alternator according to claim 1, wherein said wing portions are approximately formed in a C-shape opened toward sides of said claw-shaped magnetic poles, and said magnets are fixedly attached to inner wall surfaces of said wing portions.

3. A rotor for an alternator according to claim 1, wherein said wing portions are approximately formed in a U-shape opened toward said basic portions, and said magnets are fixedly attached to inner wall surfaces of said wing portions.

4. A rotor for an alternator according to claim 1, wherein said wing portions and said magnets are spaced from said claw-shaped magnetic poles.

5. A rotor for an alternator according to claim 4, wherein an elastic resin is filled between said reinforcing bodies and said claw-shaped magnetic poles and between said magnets and said claw-shaped magnetic poles.

6. A rotor for an alternator according to claim 1, wherein said reinforcing bodies are displaceably constructed such that during vibration, adjacent wing portions come in contact with each other.

7. A rotor for an alternator, comprising:

a pair of rotor iron cores, in which plural claw-shaped magnetic poles, each approximately formed in a trapezoidal shape, are arranged at outer circumferential portions of disk-shaped basic portions at given intervals in a circumferential direction, said rotor iron cores being fitted to a shaft and being integrated with the shaft by abutting said basic portions so as to interdigitate the claw-shaped magnetic poles with each other;

a winding would around said basic portions for generating magnetic flux by the flow of an exciting current;

plural reinforcing bodies, each approximately formed in a U-shape, and having wing portions arranged at both sides of an attaching portion having a flat plate shape, and disposed such that the attaching portion faces an inner circumferential wall surface of one of said claw-shaped magnetic poles, said wing portions being located on either side of said claw-shaped magnetic pole in the circumferential direction; and plural magnets, each fixedly attached to a wing portion of each of said reinforcing bodies and disposed on either side of said claw-shaped magnetic pole in the circumferential direction, for reducing magnetic flux leakage between adjacent claw-shaped magnetic poles, wherein a multidegree of freedom vibrating system composed of said claw-shaped magnetic poles and said reinforcing bodies having said magnets fixedly attached thereto, wherein a press-fit ring-shaped interposing object presses at least one portion of said attaching portion reinforcing bodies against the inner circumferential wall surfaces of said claw-shaped magnetic poles.

8. A rotor for an alternator according to claim 7, wherein an elastic resin is interposed between said attaching portions and said ring-shaped interposing object.

9. A rotor for an alternator according to claim 7, wherein said wing portions are approximately formed in a C-shape opened toward sides of said claw-shaped magnetic poles, and said magnets are fixedly attached to inner wall surfaces of said wing portions.

10. A rotor for an alternator according to claim 7, wherein said wing portions are approximately formed in a U-shape opened to sides of said basic portions, and said magnets are fixedly attached to inner wall surfaces of said wing portions.

11. A rotor for an alternator according to claim 7, wherein said wing portions and said magnets are spaced from said claw-shaped magnetic poles.

12. A rotor for an alternator according to claim 11, wherein an elastic resin is filled between said reinforcing bodies and said claw-shaped magnetic poles and between said magnets and said claw-shaped magnetic poles.

13. A rotor for an alternator according to claim 7, wherein said reinforcing bodies are displaceably constructed such that during vibration, adjacent wing portions come in contact with each other.

* * * * *